(12) United States Patent  
Malvicino et al.

(10) Patent No.: US 8,635,882 B2  
(45) Date of Patent: Jan. 28, 2014

(54) AUTOMOTIVE AIR-CONDITIONING SYSTEM

(75) Inventors: Carloandrea Malvicino, Orbassano (IT); Matteo Rostagno, Orbassano (IT)

(73) Assignee: C.R.F. Societá Consortile per Azioni (IT)

( * ) Notice: Subject to any disclaimer, the term of this patent is extended or adjusted under 35 U.S.C. 154(b) by 364 days.

(21) Appl. No.: 13/185,956

(22) Filed: Jul. 19, 2011

(65) Prior Publication Data

US 2012/0180980 A1    Jul. 19, 2012

(30) Foreign Application Priority Data

Jul. 19, 2010 (EP) ...................................... 10425244

(51) Int. Cl.
F25B 27/00 (2006.01)

(52) U.S. Cl.
USPC ........................................ 62/323.1; 62/324.2

(58) Field of Classification Search
USPC ......... 62/323.1, 236, 324.2, 159, 434; 165/42, 165/202
See application file for complete search history.

(56) References Cited

U.S. PATENT DOCUMENTS

| | | | | |
|---|---|---|---|---|
| 1,506,531 A | * | 8/1924 | Kasley | ............................... 62/232 |
| 2,989,453 A | * | 6/1961 | Esselman et al. | ............. 376/210 |
| 6,038,877 A | * | 3/2000 | Peiffer et al. | .................... 62/244 |
| 6,347,523 B1 | * | 2/2002 | Barrash et al. | ...................... 62/6 |
| 6,457,324 B2 | * | 10/2002 | Zeigler et al. | .................... 62/406 |
| 6,739,148 B2 | * | 5/2004 | Humburg | ......................... 62/236 |
| 6,901,765 B2 | * | 6/2005 | Amaral et al. | ................... 62/239 |
| 8,318,370 B2 | * | 11/2012 | Keogh | ........................... 429/439 |
| 2002/0053209 A1 | * | 5/2002 | Zimm et al. | ..................... 62/3.1 |
| 2003/0136555 A1 | * | 7/2003 | Dinh | ............................. 165/274 |
| 2004/0011069 A1 | * | 1/2004 | Humburg | ........................ 62/236 |
| 2004/0035130 A1 | | 2/2004 | Amaral et al. | |
| 2004/0134217 A1 | | 7/2004 | Itoh et al. | |
| 2009/0007972 A1 | * | 1/2009 | Lum et al. | ..................... 137/468 |

FOREIGN PATENT DOCUMENTS

| | | |
|---|---|---|
| EP | 1329344 A1 | 7/2003 |
| EP | 1719646 A1 | 11/2006 |
| EP | 1990221 A1 | 11/2008 |

OTHER PUBLICATIONS

"European Application Serial No. EP 10425244, European Search Report completed Nov. 23, 2010", 2 pgs.

* cited by examiner

*Primary Examiner* — Mohammad M Ali  
(74) *Attorney, Agent, or Firm* — Schwegman Lundberg & Woessner, P.A.

(57) ABSTRACT

One examples provides an automotive air-conditioning system provided with: a thermal unit having a condenser and an evaporator configured to be traversed by a refrigerant fluid and a hydraulic circuit, which is configured to be traversed by a carrier fluid and has a first portion provided with a first heat exchanger, a second portion provided with a second heat exchanger, a hot portion extending through the condenser, and a cold portion extending through the evaporator, a valve device being configured to connect selectively either the hot portion or the cold portion to the first portion and the second portion.

20 Claims, 3 Drawing Sheets

AUTOMOTIVE AIR-CONDITIONING SYSTEM

RELATED APPLICATION

This application claims the benefit of priority under 35 U.S.C. Section 119 to European Patent Application Serial No. 10425244.0, filed on Jul. 19, 2010, which is incorporated herein by reference in its entirety.

This application is related to EP1719646, filed May 3, 2005, commonly assigned and incorporated herein by reference in its entirety; and EP1990221 filed May 10, 2007, commonly assigned and incorporated herein by reference in its entirety.

TECHNICAL FIELD

The present subject matter relates to an automotive air-conditioning system.

In particular, the present subject matter finds a particularly advantageous use in the case of electrically propelled motor vehicles, to which the following description will make explicit reference without thereby this implying any loss of generality.

BACKGROUND

Air conditioning systems with increased efficiency are desired for automobiles, including vehicles using an engine to provide motive force, and vehicles using a motor to provide motive force.

OVERVIEW

Known from the patent document No. EP1719646 filed in the name of the present applicant and incorporated herein by reference in its entirety is an automotive air-conditioning system designed to be installed on a motor vehicle provided with an internal-combustion engine and comprising an assembly of heat exchangers and respective fans arranged inside the passenger compartment of the motor vehicle, a heating circuit associated to the internal-combustion engine, and a cooling circuit, which extends through the evaporator of a refrigerating circuit. The heat-exchanger assembly is traversed by a carrier fluid and is selectively set in communication, via a valve device, with the cooling circuit and the heating circuit in such a way as to supply to the passenger compartment a flow of cold air and of hot air, respectively.

This system presents considerable advantages deriving from the fact that it uses a single heat-exchanger assembly that can be selectively associated to the cooling circuit and to the heating circuit.

Known from the document No. EP1990221 filed in the name of the present applicant and incorporated herein by reference in its entirety is an automotive air-conditioning system designed to be installed on a motor vehicle provided with an internal-combustion engine and comprising a refrigerating circuit, which is provided with an evaporator designed to exchange heat with a carrier fluid of a circuit for cooling the passenger compartment, and a condenser designed to exchange heat with a carrier fluid of a circuit for cooling the internal-combustion engine. This system presents the considerable advantage that the components of the refrigerating circuit, i.e., the condenser, the evaporator, and an intermediate exchanger, are assembled together in such a way as to form a compact enbloc assembly, which is arranged, for example, in the engine compartment and consequently enables both ease of installation of the air-conditioning system in the motor vehicle, as well as ease of the operations of cleaning thereof, and reduction in the length of the pipes necessary for making up the refrigerating circuit, consequently reducing the amount of refrigerant fluid necessary and the risks due to the pressure and/or flammability of the refrigerant fluid.

Examples of the present subject matter provide an automotive air-conditioning system of an improved type, which will be able to combine in itself all the advantages of the known systems described above and will be also usable on electrically propelled or thermal/electric hybrid motor vehicles.

According to the present subject matter, an automotive air-conditioning system is provided as specified in the annexed claims.

BRIEF DESCRIPTION OF THE DRAWINGS

The invention will now be described with reference to the annexed drawings, which illustrate a non-limiting example of embodiment thereof and in which.

DETAILED DESCRIPTION

Figure 1:
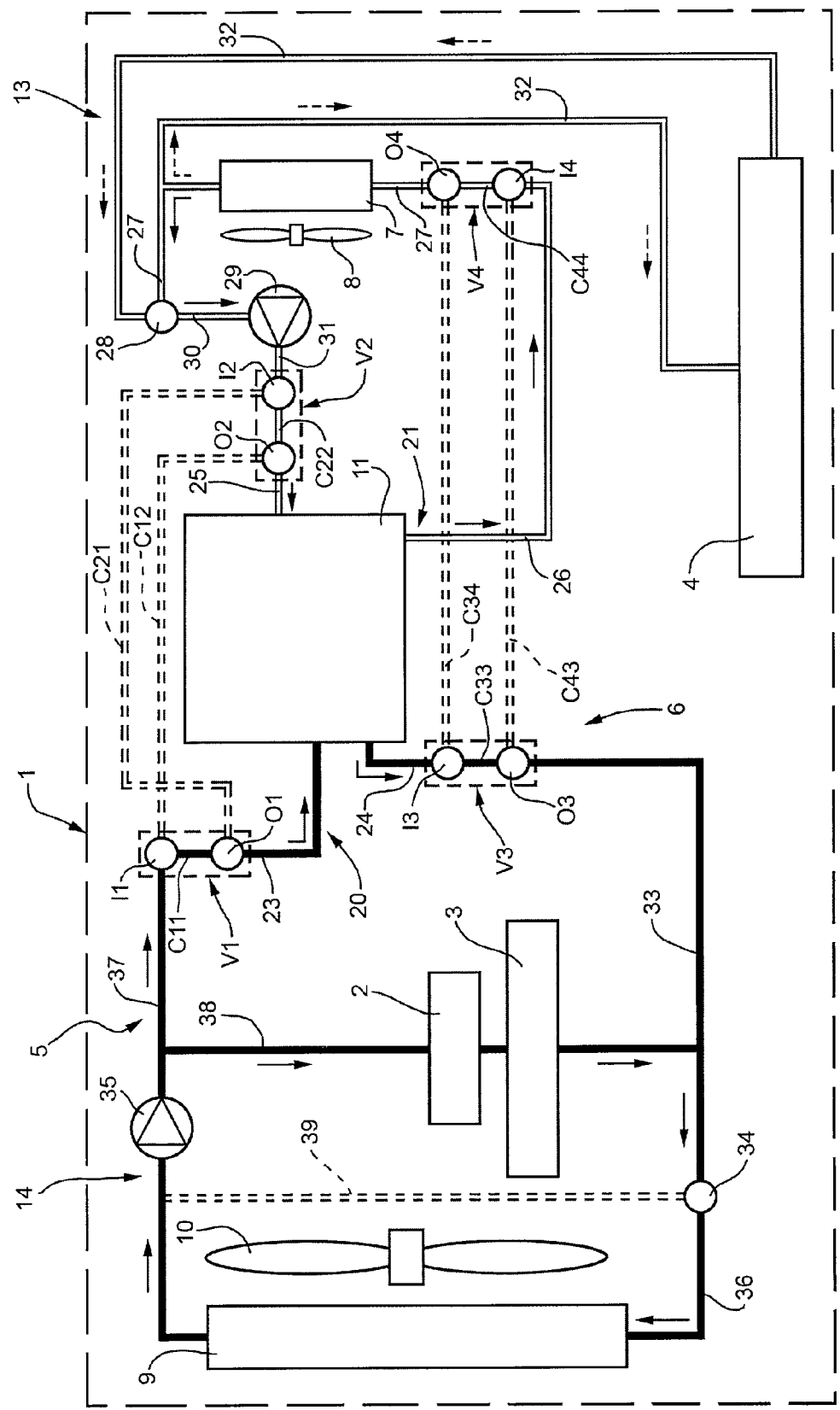
FIG. 1 is a schematic illustration of an embodiment of the air-conditioning system of the present subject matter installed on a motor vehicle.
Figure 2:
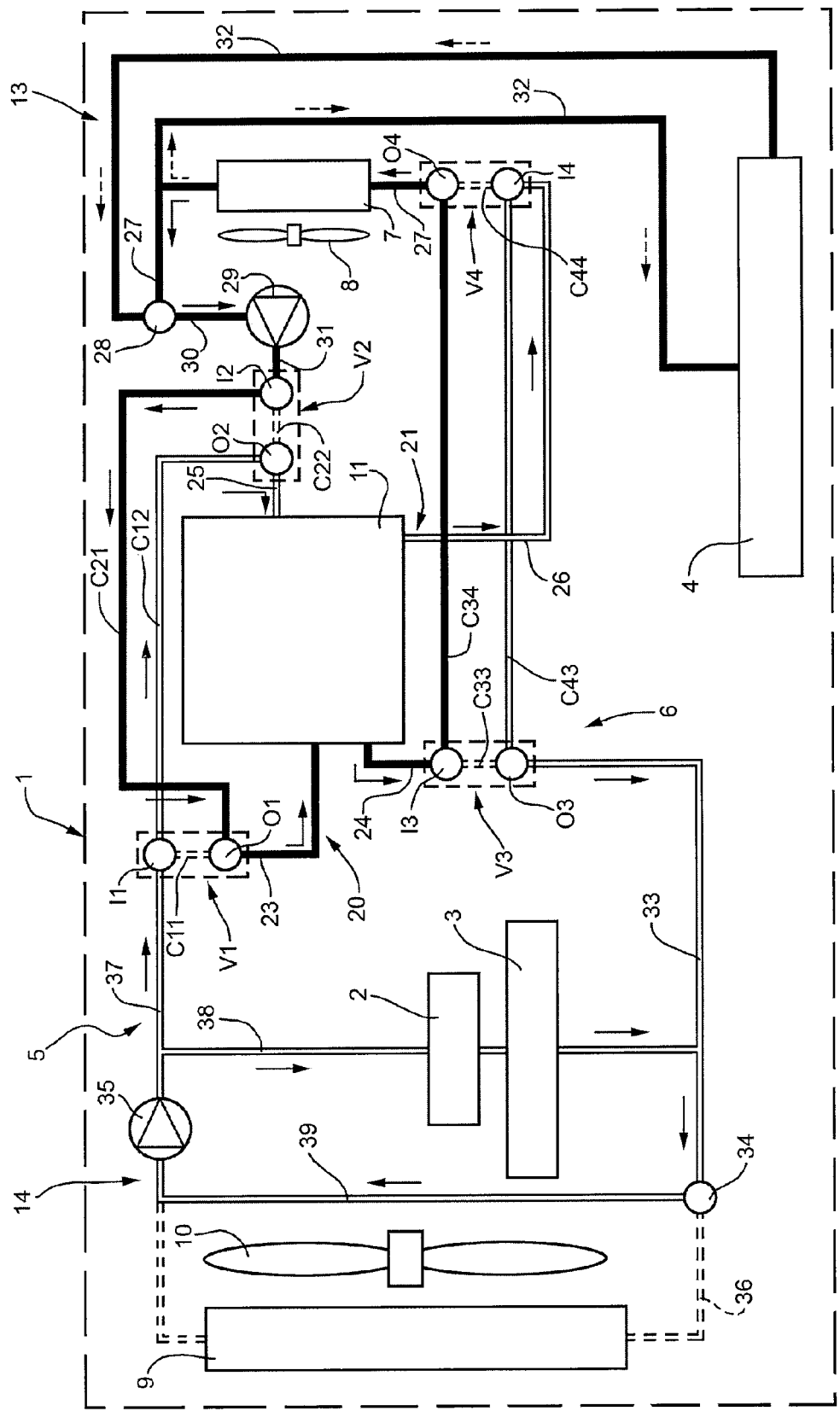
FIG. 2 is similar to FIG. 1 and illustrates the air-conditioning system of FIG. 1 in a different operating configuration.

In FIGS. 1 and 2, designated, as a whole, by 1 is a motor vehicle, in particular an electrically propelled automobile for transporting persons, which comprises, in a known way: an engine unit 2, in turn comprising one or more electric motors; a management unit 3, in turn comprising power and control electronic components for controlling the engine unit 2; and a battery pack 4.

The motor vehicle 1 is moreover provided with an air-conditioning system, generally designated by 5, which has the function both of regulating the temperature and humidity of the air in the passenger compartment of the motor vehicle 1, bringing them to the desired values, and of maintaining the temperature of the engine unit 2 and management unit 3 and of the battery pack 4 around respective pre-set operating values.

The automotive air-conditioning system 5 comprises: a hydraulic circuit 6, which is traversed by a carrier fluid, i.e., a heat-exchange fluid, e.g. constituted by a mixture of water and glycol, and extends through a heat exchanger 7, which is set in the passenger compartment (not illustrated), normally underneath the dashboard (not illustrated), of the motor vehicle 1 and is associated to a respective fan 8 for heat exchange between the carrier fluid and the air of the passenger compartment and/or the external air and for supply, within the passenger compartment, of a flow of hot or cold air; a further heat exchanger 9, which normally constitutes the usual radiator arranged in an engine compartment (not illustrated) of the motor vehicle 1 and is associated to a respective fan 10 for heat exchange between the carrier fluid and the external air; and, finally, a compact thermal unit 11, in which a refrigerant fluid traverses a respective hydraulic circuit 12 (FIG. 3) for carrying out a cycle of refrigeration and heat-exchange, in the way that will be explained in what follows, with the carrier fluid.

In particular, according to what is schematically illustrated in FIG. 1, the hydraulic circuit 6 comprises two portions 13 and 14, of which the portion 13 extends through the heat exchanger 7 and is designed for air-conditioning of the passenger compartment and for control in temperature of the battery pack 4, and the portion 14 extends through the heat exchanger 9 and is designed for control in temperature of the engine unit 2 and of the management unit 3.

The portions 13 and 14 are configured so as not to interact with one another but so as to interact both, simultaneously, with the thermal unit 11 for subtracting or yielding heat from/to the passenger compartment and, respectively, for subtracting heat from the engine unit 2 and management unit 3.

Figure 3:
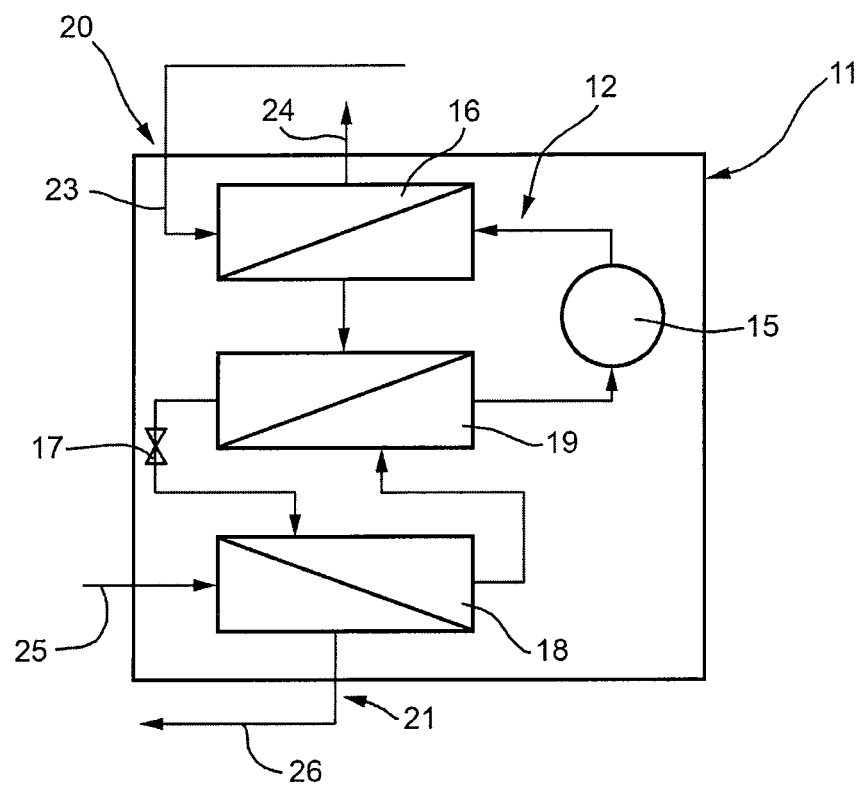
FIG. 3 is a schematic illustration of the system of FIG. 1.

According to what is illustrated in FIG. 3, the thermal unit 11 is of the known type described in the patent No. EP 1990221, which is incorporated herein by reference in its entirety, and is defined by an enbloc assembly normally housed in the engine compartment of the motor vehicle 1 and comprising, set in series along the hydraulic circuit 12, a compressor 15, a hot section, in the case in point in the form of a condenser 16, an expansion valve 17, a cold section, in the case in point in the form of an evaporator 18, and, finally, an intermediate heat exchanger 19, set between the condenser 16 and the expansion valve 17.

According to a variant (not illustrated in the attached figures), the compressor 15 is located outside of the enbloc assembly, which includes only the other components of the compact thermal unit 11, as illustrated in FIGS. 1 and 2 of EP 1990221.

Heat exchange between the thermal unit 11 and the carrier fluid that traverses the portions 13 and 14 takes place via two further portions of the hydraulic circuit 6, in the case in point a hot portion 20 and a cold portion 21, where the hot portion 20 extends through the condenser 16 for cooling the refrigerant fluid and heating the carrier fluid, and the cold portion 21 extends through the evaporator 18 for heating the refrigerant fluid and cooling the carrier fluid.

The hot portion 20 and the cold portion 21 are connected to the rest of the hydraulic circuit 6, i.e., to the portions 13 and 14, via a valve device 22 designed to set the portion 13 in communication with the cold portion 21 and the portion 14 in communication with the hot portion 20, or, alternatively, the portion 13 in communication with the hot portion 20 and the portion 14 in communication with the cold portion 21.

In detail, according to what is illustrated in FIGS. 1 and 3, the hot portion 20 comprises an inlet branch 23 and an outlet branch 24 of the condenser 16. Likewise, the cold portion 21 comprises an inlet branch 25 and an outlet branch 26 of the evaporator 18.

According to what is illustrated schematically in FIG. 1, the valve device 22 comprises four valves, designated by V1, V2, V3, V4, each of which is provided with an inlet, designated by the letter I associated to the reference number of the respective valve, and an outlet, designated by the letter O associated to the reference number of the respective valve. Each inlet I is connected to the respective outlet O via a respective branch C, the branches being designated in FIGS. 1 and 2 by the references C11, C22, C33, C44.

The valves V1 and V2 are in communication with one another via a branch C12, which connects the inlet I1 to the outlet O2, and via a branch C21, which connects the inlet I2 to the outlet O1. Likewise, the valves V3 and V4 are in communication with one another via a branch C34, which connects the inlet I3 to the outlet O4, and via a branch C43, which connects the inlet I4 to the outlet O3.

The portion 13 of the circuit 6 comprises an inlet branch 27, which extends, starting from the valve V4, through the heat exchanger 7 and gives out into a valve 28 connected to a pump 29 via an intake branch 30. In turn, the pump 29 is connected to the valve V2 via a delivery branch 31. The portion 13 further comprises a by-pass branch 32, which branches off from the inlet branch 27 downstream of the heat exchanger 7, extends through the battery pack 4, and gives out into the valve 28. The valve 28 is, for example, defined by a two-way and two-position solenoid valve designed to set in communication the intake branch 30 with the by-pass branch 32 or with a terminal portion of the inlet branch 27. In other words, in a first position, the valve 28 closes the outlet of the by-pass branch 32, and all the carrier fluid that has traversed the heat exchanger 7 is drawn in directly by the pump 29 without traversing the battery pack 4; in a second position, the valve 28 closes the outlet of the inlet branch 27, and all the carrier fluid that has traversed the heat exchanger 7 is forced, by suction of the pump 29, to flow through the by-pass branch 32 and the battery pack 4 before reaching the pump 29.

The portion 14 of the circuit 6 comprises an inlet branch 33, which extends from the valve V3 to a valve 34 connected to a pump 35 via an intake branch 36, which extends through the heat exchanger 9. In turn, the pump 35 is connected to the valve V1 via a first delivery branch 37 and to the inlet branch 33 via a second delivery branch 38, extending through the engine unit 2 and the management unit 3. The portion 14 finally comprises a by-pass branch 39 of the heat exchanger 9. In particular, the by-pass branch 39 is set in parallel to the intake branch 36 and extends between the valve 34 and a point of the intake branch 36 set upstream of the pump 35.

The valve 34 is for example defined by a two-way and two-position solenoid valve designed to set in communication a terminal portion of the inlet branch 33 with the intake branch 36 or with the by-pass branch 39. In other words, in a first position, the valve 34 closes the inlet of the by-pass branch 39, and the carrier fluid coming from the inlet branch 33 and from the delivery branch 38 reaches the pump 35 through the intake branch 36 and the heat exchanger 9. In a second position, the valve 34 closes the inlet of the intake branch 36, and the carrier fluid coming from the inlet branch 33 and from the delivery branch 38 reaches the pump 35 through the by-pass branch 39, without traversing the heat exchanger 9.

Figure 4:
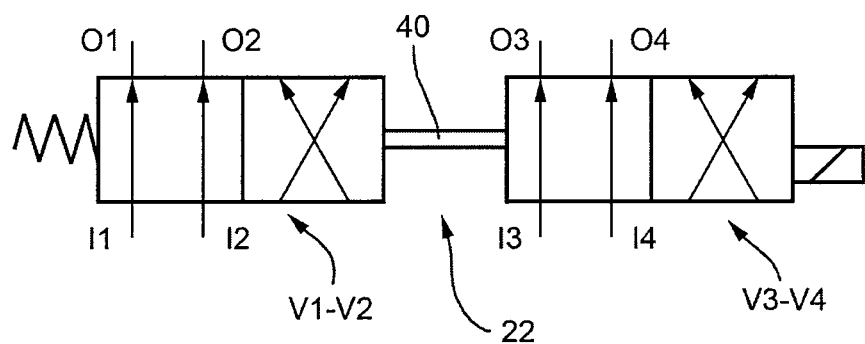
FIG. 4 is a schematic illustration of the system of FIG. 2.

According to what is illustrated in FIG. 4, the valve device 22, which, for reasons of clarity, has been represented schematically in FIGS. 1 and 2 by means of the four valves V1, V2, V3, V4, is defined, in actual fact, by a single valve assembly comprising two four-way and two-position solenoid valves V1-V2 and V3-V4 connected to one another by means of a mechanical connection element 40, which renders them suitable for being actuated synchronously, via a single actuator associated to one of the two solenoid valves V1-V2 and V3-V4, so as to shift, against the action of a spring, between a first operating position (illustrated in FIG. 4) and a second operating position.

In particular, the valves designated by V1 and V2 in FIGS. 1 and 2 constitute, as a whole, the solenoid valve V1-V2, and the branches C11, C22, C12 and C21 are virtual branches defined, in practice, by respective pipes made in the solenoid valve V1-V2 itself. Likewise, the valves designated by V3 and V4 in FIGS. 1 and 2 constitute, as a whole, the solenoid valve V3-V4, and the branches C33, C44, C34 and C43 are virtual branches defined, in practice, by respective pipes made in the solenoid valve V3-V4 itself. According to a variant (not illustrated), the mechanical connection element 40 is absent, and the solenoid valves V1-V2 and V3-V4 are independent of one another and are designed to be actuated synchronously by respective actuators.

Operation of the automotive air-conditioning system 5 will be described in what follows with reference to two different operating configurations that the system can selectively assume: a first operating configuration, illustrated in FIG. 1, in which the system operates as system for cooling the passenger compartment, and a second operating configuration, illustrated in FIG. 2, in which the system operates as system for heating the passenger compartment.

In both of the operating configurations described above, the thermal unit 11 functions by performing cyclically a refrigerating cycle of a known type. In the case in point, according to what is illustrated in FIG. 3, the compressor 15 compresses the refrigerant fluid and supplies it, in the form of gas at high pressure and high temperature, to the condenser 16, in which the refrigerant fluid condenses and yields heat to the carrier fluid that traverses the hot portion 20 of the hydraulic circuit 6. From the condenser 16 the refrigerant fluid passes to the expansion valve 17, where it undergoes a sharp drop in pressure before reaching the evaporator 18, in which the refrigerant fluid evaporates absorbing heat from the carrier fluid that traverses the cold portion 21 of the hydraulic circuit 6. From the evaporator 18, the refrigerant fluid returns to the compressor 15 through the intermediate heat exchanger 19, in which the refrigerant fluid absorbs heat from the flow of refrigerant fluid that from the condenser 16 flows towards the expansion valve 17.

As regards what has been set forth above, it should be pointed out that the presence of the intermediate heat exchanger 19 is not essential for operation of the thermal unit 11, and its function is that of improving the thermal yield of the thermal unit 11 itself. According to a more simplified variant (not illustrated) of the automotive air-conditioning system 5, the thermal unit 11 is without the intermediate heat exchanger 19.

To complete what has been set forth above, it should moreover be pointed out that the thermal unit 11, which, in the example illustrated and described, is a vapour-compression thermal unit, can be replaced, without modifying operation of the automotive air-conditioning system 5, by a known thermal unit of a different nature and provided with a hot section designed to exchange heat with the carrier fluid via the hot portion 20, and a cold section designed to exchange heat with the carrier fluid via the cold portion 21. For example, according to variants not illustrated, the thermal unit 11 is constituted by a thermal unit with ejection cycle or else an absorption thermal unit or else a thermal unit with magnetic refrigeration, or else a thermal unit of any other nature.

According to what is illustrated in FIG. 1, when the automotive air-conditioning system 5 operates as system for cooling the passenger compartment, for example in summer, the valve device 22 is set in its first operating position (FIG. 4), in which the inlet I of each valve V1, V2, V3, V4 is connected to the respective outlet O. In this way, the portion 13 is connected to the cold portion 21 via the branch C22 of the valve V2 and the branch C44 of the valve V4, and the portion 14 is connected to the hot portion 20 via the branch C11 of the valve V1 and the branch C33 of the valve V3.

It follows that the carrier fluid that circulates, under the thrust of the pump 29, along the portion 13 and the cold portion 21 is cooled through the evaporator 18 and enables, through the heat exchanger 7 and the respective fan 8, supply of a flow of cold air inside the passenger compartment.

The valve 28 of the portion 13 is controlled by a control unit (not illustrated) in such a way as to enable or otherwise passage of the carrier fluid along the by-pass branch 32 and through the battery pack 4 according to whether the value of the temperature of the battery pack 4 measured by a sensor (not illustrated) is higher or lower than a pre-set maximum value.

At the same time, the carrier fluid that circulates, under the thrust of the pump 35, along the portion 14 and the hot portion 20 is able to remove heat from the condenser 16 and from the engine unit 2 and the management unit 3 and to dissipate this heat outside the motor vehicle 1 through the heat exchanger 7 and the respective fan 8.

In this configuration, the valve 34 is controlled by the control unit (not illustrated) in such a way as to close the inlet of the by-pass branch 39 and cause all the carrier fluid to flow along the intake branch 36 and through the heat exchanger 9.

According to what is illustrated in FIG. 2, when the automotive air-conditioning system 5 operates as system for heating the passenger compartment, for example in winter, the valve device 22 is set in its second operating position, in which the inlets I1, I3 of the valves V1 and V3 are connected, respectively, to the outlet O2 of the valve V2 and to the outlet O4 of the valve V4. In this way, the portion 13 is connected to the hot portion 20 via the branches C13 and C21, and the portion 14 is connected to the cold portion 21 via the branches C12 and C43.

It follows that the carrier fluid that circulates, under the thrust of the pump 29, along the portion 13 and the hot portion 20 is able to remove heat from the condenser 16 and to supply a flow of hot air inside the passenger compartment through the heat exchanger 7 and the respective fan 8.

In a way similar to what has been described previously, the valve 28 of the portion 13 is controlled by the control unit (not illustrated) in such a way as to enable or otherwise passage of the carrier fluid along the by-pass branch 32 and through the battery pack 4 according to whether the value of the temperature of the battery pack 4 measured by the sensor (not illustrated) is lower than a pre-set minimum value or otherwise.

At the same time, the carrier fluid that circulates, under the thrust of the pump 35, along the portion 14 and the cold portion 21 is cooled through the evaporator 18 and is able to remove the excess heat from the engine unit 2 and management unit 3.

In this configuration, the valve 34 is controlled by the control unit (not illustrated) in such a way as to close the inlet of the intake branch 36 and cause all the carrier fluid to flow along the by-pass branch 39. In this way, by preventing the carrier fluid from traversing the heat exchanger 9, heat exchange between the carrier fluid and the external air is prevented from cooling further the carrier fluid itself and even possibly causing freezing thereof.

To conclude what has been set forth above, it should be pointed out that modifications and variations may be made to what has been described and illustrated herein, without thereby departing from the sphere of protection of the present invention, as defined in the annexed claims.

In particular, the automotive air-conditioning system 5 described above is able to operate on a motor vehicle provided with internal-combustion engine or hybrid drive instead of an electric drive. In the case (not illustrated) of internal-combustion motor vehicle, the engine unit 2 comprises at least one internal-combustion engine and the motor vehicle 1 is without the management unit 3 and the battery pack 4 and, consequently, the by-pass branch 28, which enables, in the example illustrated, cooling or heating the battery pack 4.

What is claimed is:

1. An automotive air-conditioning system for a motor vehicle including a passenger compartment and an engine unit, the system comprising:
    a thermal unit provided with a hot section and a cold section; and
    a hydraulic circuit, which is configured to be flown by a carrier fluid and comprises:
        a first portion provided with a first heat exchanger;
        a second portion provided with a second heat exchanger;
        a third portion including a hot portion extending through said hot section and including an inlet and an outlet; and
        a fourth portion including a cold portion extending through said cold section and including an inlet and an outlet; and
    a valve device configured to connect selectively one of the hot portion and the cold portion with one of the first portion and second portion to selectively switch the hydraulic circuit between a first configuration, in which the first portion is connected to the cold portion and the second portion is connected to the hot portion, and a second configuration, in which the first portion is connected to the hot portion and the second portion is connected to the cold portion.

2. The system of claim 1, wherein the valve device comprises a first four-way two-position solenoid valve associated to said inlets and a second valve that is a four-way two-position solenoid valve, the second valve associated to said outlets, wherein,
    in the first configuration, the first valve and the second valve connect the inlet and, respectively, the outlet of the cold portion with the first portion so that the first heat exchanger is fluidically connected to the cold portion, and connect the inlet and, respectively, the outlet of the hot portion with the second portion so that the second heat exchanger is fluidically connected to the hot portion; and
    in the second configuration, the first valve and the second valve connect the inlet and, respectively, the outlet of the hot portion with the first portion so that the first heat exchanger is fluidically connected to the hot portion, and connect the inlet and, respectively, the outlet of the cold portion with the second portion so that the second heat exchanger is fluidically connected to the cold portion.

3. The system of claim 2, wherein the first solenoid valves and the second valve are connected to one another by a mechanical connection element and are configured to be actuated synchronously by a single actuator.

4. The system of claim 2, wherein the first solenoid valves and the second valve are connected to one another by means for actuating in a synchronous way by a single actuator.

5. The system of claim 1, wherein the first heat exchanger is configured to exchange heat between the carrier fluid and at least one of the air of the passenger compartment and the air external to the motor vehicle, to supply the passenger compartment with a flow of cold air in said first configuration, and a flow of hot air in said second configuration.

6. The system of claim 1, wherein the second portion extends through the engine unit; and the second heat exchanger is configured to, in the first configuration, exchange heat between the carrier fluid and the air external to the motor vehicle to dissipate the heat removed from the engine unit and from the hot section.

7. The system of claim 6, wherein the second portion comprises:
    a pump;
    a first delivery branch, which is connected to the hot portion in the first configuration and to the cold portion in the second configuration; a second delivery branch, which extends through the engine unit; and
    an intake branch, which extends through the second heat exchanger.

8. The system of claim 7, wherein the second portion comprises first by-pass of the second heat exchanger, which in turn comprise a first by-pass branch arranged in parallel to the intake branch, and a valve operable to fluidically isolate the first by-pass branch when the hydraulic circuit is in the first configuration so as to cause the carrier fluid to flow only through the intake branch and the second heat exchanger; the valve being also operable to fluidically isolate the intake branch and the second heat exchanger, when the hydraulic circuit is in the second configuration so as to cause the carrier fluid to flow only through the first by-pass branch.

9. The system of claim 7, wherein the second portion comprises means for by-passing the second heat exchanger, which in turn comprise a first by-pass branch arranged in parallel to the intake branch, and a valve operable to fluidically isolate the first by-pass branch when the hydraulic circuit is in the first configuration so as to cause the carrier fluid to flow only through the intake branch and the second heat exchanger; the valve being also operable to fluidically isolate the intake branch and the second heat exchanger, when the hydraulic circuit is in the second configuration so as to cause the carrier fluid to flow only through the first by-pass branch.

10. The system of claim 6, wherein the motor vehicle is an electric or hybrid motor vehicle and comprises a management unit configured to manage power and control electronic components to control the engine unit; the second portion extending through said management unit to remove heat from the management unit when the hydraulic circuit is in the first configuration and in the second configuration.

11. The system of claim 10, wherein the motor vehicle comprises a battery pack; the first portion comprising a second by-pass of the battery pack configured to cause the carrier fluid to selectively flow through the battery pack in association with the temperature of the battery pack with respect to a pre-set limit value.

12. The system of claim 10, wherein the motor vehicle comprises a battery pack; the first portion comprising second means for by-passing of the battery pack and for causing the carrier fluid to selectively flow through the battery pack in association with the temperature of the battery pack with respect to a pre-set limit value.

13. The system of claim 1, wherein the thermal unit is a vapour-compression thermal unit, in which the hot section comprises a condenser and the cold section comprises an evaporator; the thermal unit further comprising a hydraulic refrigerating circuit extending through the condenser and the evaporator and configured to be traversed by a refrigerant fluid.

14. The system of claim 13, wherein the thermal unit is an enbloc assembly configured to be housed in an engine compartment of the motor vehicle.

15. The system of claim 13, wherein the hydraulic refrigerating circuit comprises an intermediate heat exchanger configured to enable a heat exchange between the refrigerant fluid leaving the evaporator and the refrigerant fluid leaving the condenser.

16. A system comprising, comprising:
a passenger compartment;
an engine unit; and
an automotive air-conditioning system comprising:
- a thermal unit provided with a hot section and a cold section; and
- a hydraulic circuit, which is configured to be flown by a carrier fluid and comprises:
  - a first portion provided with a first heat exchanger;
  - a second portion provided with a second heat exchanger;
  - a third portion including a hot portion extending through said hot section and including an inlet and an outlet; and
  - a fourth portion including a cold portion extending through said cold section and including an inlet and an outlet;
the system further comprising a valve device configured to connect selectively one of the hot portion and the cold portion with one of the first portion and second portion to selectively switch the hydraulic circuit between a first configuration, in which the first portion is connected to the cold portion and the second portion is connected to the hot portion, and a second configuration, in which the first portion is connected to the hot portion and the second portion is connected to the cold portion.

17. The system of claim 16, wherein the valve device comprises a first four-way two-position solenoid valve associated to said inlets and a second valve that is a four-way two-position solenoid valve, the second valve associated to said outlets, wherein, in the first configuration, the first valve and the second valve connect the inlet and, respectively, the outlet of the cold portion with the first portion so that the first heat exchanger is fluidically connected to the cold portion, and connect the inlet and, respectively, the outlet of the hot portion with the second portion so that the second heat exchanger is fluidically connected to the hot portion; and in the second configuration, the first valve and the second valve connect the inlet and, respectively, the outlet of the hot portion with the first portion so that the first heat exchanger is fluidically connected to the hot portion, and connect the inlet and, respectively, the outlet of the cold portion with the second portion so that the second heat exchanger is fluidically connected to the cold portion.

18. The system of claim 17, wherein the first solenoid valves and the second valve are connected to one another by a mechanical connection element and are configured to be actuated synchronously by a single actuator.

19. The system of claim 17, wherein the first solenoid valves and the second valve are connected to one another by means for actuating in a synchronous way by a single actuator.

20. The system of claim 16, wherein the first heat exchanger is configured to exchange heat between the carrier fluid and at least one of the air of the passenger compartment and the air external to the motor vehicle, to supply the passenger compartment with a flow of cold air in said first configuration, and a flow of hot air in said second configuration.

* * * * *